US007266559B2

United States Patent
Cook et al.

(10) Patent No.: US 7,266,559 B2
(45) Date of Patent: Sep. 4, 2007

(54) METHOD AND APPARATUS FOR ADAPTING A SEARCH CLASSIFIER BASED ON USER QUERIES

(75) Inventors: Daniel B. Cook, Seattle, WA (US); Chad S. Oftedal, Redmond, WA (US); Scott E. Seiber, Medina, WA (US); Matthew A. Goldberg, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 631 days.

(21) Appl. No.: 10/310,408

(22) Filed: Dec. 5, 2002

(65) Prior Publication Data

US 2004/0111419 A1 Jun. 10, 2004

(51) Int. Cl.
*G06F 7/10* (2006.01)
*G06F 15/18* (2006.01)

(52) U.S. Cl. ............ 707/100; 707/101; 707/102; 707/4; 707/10; 706/12; 706/46; 706/47

(58) Field of Classification Search ............ 707/1–6, 707/10, 100–104.1; 706/25, 26, 45, 12; 382/159, 382/224; 704/9
See application file for complete search history.

(56) References Cited

U.S. PATENT DOCUMENTS

| | | | | |
|---|---|---|---|---|
| 5,671,333 A | * | 9/1997 | Catlett et al. ............ | 706/12 |
| 6,192,360 B1 | * | 2/2001 | Dumais et al. ............ | 707/6 |
| 6,253,169 B1 | * | 6/2001 | Apte et al. ............ | 704/9 |
| 6,789,069 B1 | * | 9/2004 | Barnhill et al. ............ | 706/12 |
| 6,886,008 B2 | * | 4/2005 | Blayvas et al. ............ | 707/3 |
| 6,901,398 B1 | * | 5/2005 | Horvitz et al. ............ | 707/5 |
| 7,062,488 B1 | * | 6/2006 | Reisman ............ | 707/8 |
| 7,089,226 B1 | * | 8/2006 | Dumais et al. ............ | 707/3 |
| 2001/0037324 A1 | * | 11/2001 | Agrawal et al. ............ | 707/1 |
| 2002/0078044 A1 | * | 6/2002 | Song et al. ............ | 707/6 |
| 2002/0103775 A1 | * | 8/2002 | Quass et al. ............ | 706/12 |
| 2002/0107843 A1 | * | 8/2002 | Biebesheimer et al. ............ | 707/3 |
| 2002/0194161 A1 | * | 12/2002 | McNamee et al. ............ | 707/2 |
| 2003/0004966 A1 | * | 1/2003 | Bolle et al. ............ | 707/104.1 |
| 2003/0033274 A1 | * | 2/2003 | Chow et al. ............ | 707/1 |
| 2003/0046297 A1 | * | 3/2003 | Mason ............ | 707/102 |
| 2003/0046311 A1 | * | 3/2003 | Baidya et al. ............ | 707/200 |

(Continued)

OTHER PUBLICATIONS

Ye et al.—"PEBL: Positive Example Based Laerning for Web Page Classification Using SVM"—ACM 2002 (pp. 239-248).*

(Continued)

*Primary Examiner*—Cam Y Truong
*Assistant Examiner*—Anh Ly
(74) *Attorney, Agent, or Firm*—Theodore M. Magee; Westman, Champlin & Kelly, P.A.

(57) ABSTRACT

A method and computer-readable medium are provided for constructing a classifier for classifying search queries. The classifier is constructed by receiving a query from a user and applying the query to a classifier to identify the task. An unsupervised mapping between the query and the task is then identified and is used to train a new classifier. Under one embodiment, the unsupervised mapping is identified based on a user's selection of the task.

7 Claims, 6 Drawing Sheets

U.S. PATENT DOCUMENTS

| | | | |
|---|---|---|---|
| 2003/0093395 A1* | 5/2003 | Shetty et al. | 707/1 |
| 2003/0110147 A1* | 6/2003 | Li et al. | 706/1 |
| 2003/0154181 A1* | 8/2003 | Liu et al. | 707/1 |
| 2003/0200188 A1* | 10/2003 | Moghaddam | 706/25 |
| 2003/0233350 A1* | 12/2003 | Dedhia et al. | 707/3 |
| 2004/0120572 A1* | 6/2004 | Luo et al. | 382/159 |
| 2004/0162852 A1* | 8/2004 | Qu et al. | 707/104.1 |
| 2005/0066236 A1* | 3/2005 | Goeller et al. | 714/39 |
| 2005/0071300 A1* | 3/2005 | Bartlett et al. | 706/12 |
| 2005/0108200 A1* | 5/2005 | Meik et al. | 707/3 |
| 2005/0131847 A1* | 6/2005 | Weston et al. | 706/12 |
| 2005/0216426 A1* | 9/2005 | Weston et al. | 706/12 |

OTHER PUBLICATIONS

Fabrizio Sebastiani—"Machine Learning i Automated Text Categorization"—ACM Computing Surveys (CSUR) V. 34, issue 1 (Mar. 2002) (pp. 1-47).*

Yu et al.—"PEBL: Positive Example Based learning for web page Classification Using SVM"—ACM—2000 SIGKDD'02 Edmonton, Alberta, Canada (pp. 239-248).*

Doan et al._Learning to Map between Ontologies on the Semantic Web—ACM 1-58113-449-May 2, 2005 May 7-11, 2002, Honolulu, Hawaii,m USA (pp. 1-21).*

Zelikovitz et al.—"Using LSI for Text Classification in the Presence of Background Text"—ACM 11, 5-10, 2001 Atlanta, Georgia, USA (pp. 113-118).*

Vishwanathan, S.V.M & Narasimha Mruty, M., "SSVM: A Simple SVM Algorithm," Proceedings of the 2002 International Joint Conference on Neural Networks, vol. 3, pp. 2393-2398 (2002).

Guodong Guo; Hong-Jiang Zhang; Li, S.Z., "Distance-From-Boundary As A Metric for Texture Image Retrieval," IEEE International Conference on Acoustics, Speech and Signal Processing, vol. 3, pp. 1629-1632 (2001).

Karypis, G.; Eui-Hong Han, "Fast Supervised Dimensionality Reduction Algorithm With Applications to Document Categorization and Retrieval," Proceedings of the Ninth International Conference on Information and Knowledge Management, pp. 12-19 (2000).

Pedroso, J.P.; Murata, N., "Optimisation on Support Vector Machines," Proceedings of the IEEE-INNS-ENNS International Joint Conference on Neural Networks, vol. 6, pp. 399-404 (2000).

Taira, H.; Haruno, M., "Feature Selection in SVM Text Categorization," Proceedings Sixteenth National Conference on Artifiical Intelligence, pp. 480-486 (1999).

Kia, S.J.; Coghill, S.G., "A Mapping Neural Network and its Application to Voiced-Unvoiced-Silence Classification," International Two Stream Conference on Artificial Neural Networks and Expert Systems, pp. 104-108 (1993).

Gutfinger, D.; Sklansky, J., "Robust Classifiers by Mixed Adaptation," IEEE Transactions on Pattern Analysis and Machine Intelligence, vol. 13, No. 6, pp. 552-567 (Jun. 1991).

Breiman L., "Using Iterated Bagging to Debias Regressions," Machine Learning, vol. 45, No. 3, pp. 261-277 (2001).

Kia et al., "A Mapping Neural Network Using Unsupervised and Supervised Training," International Joint Conference on Neural Networks, Jul. 8-12, 1991, Seattle, WA.

* cited by examiner

METHOD AND APPARATUS FOR ADAPTING A SEARCH CLASSIFIER BASED ON USER QUERIES

BACKGROUND OF THE INVENTION

The present invention relates to text classifiers. In particular, the present invention relates to the classification of user queries.

In the past, search tools have been developed that classify user queries to identify one or more tasks or topics that the user is interested in. In some systems, this was done with simply key-word matching in which each key word was assigned to a particular topic. In other systems, more sophisticated classifiers have been used that use the entire query to make a determination of the most likely topic or task that the user may be interested in. Examples of such classifiers include support vector machines that provide a binary classification relative to each of a set of tasks. Thus, for each task, the support vector machine is able to decide whether the query belongs to the task or not.

Such sophisticated classifiers are trained using a set of queries that have been classified by a librarian. Based on the queries and the classification given by the librarian, the support vector machine generates a hyper-boundary between those queries that match to the task and those queries that do not match to the task. Later, when a query is applied to the support vector machine for a particular task, the distance between the query and the hyper-boundary determines the confidence level with which the support vector machine is able to identify the query as either belonging to the task or not belonging to the task.

Although the training data provided by the librarian is essential to initially training the support vector machine, such training data limits the performance of the support vector machine over time. In particular, training data that includes current-events queries becomes dated over time and results in unwanted topics or tasks being returned to the user. Although additional librarian-created training data can be added over time to keep the support vector machines current, such maintenance of the support vector machines is time consuming and expensive. As such, a system is needed for updating search classifiers that requires less human intervention, while still maintaining a high standard of precision and recall.

SUMMARY OF THE INVENTION

A method and computer-readable medium are provided for constructing a classifier for classifying search queries. The classifier is constructed by receiving a query from a user and applying the query to a classifier to identify the task. An unsupervised mapping between the query and the task is then identified and is used to train a new classifier. Under one embodiment, the unsupervised mapping is identified based on a user's selection of the task.

DETAILED DESCRIPTION OF ILLUSTRATIVE EMBODIMENTS

Figure 1:
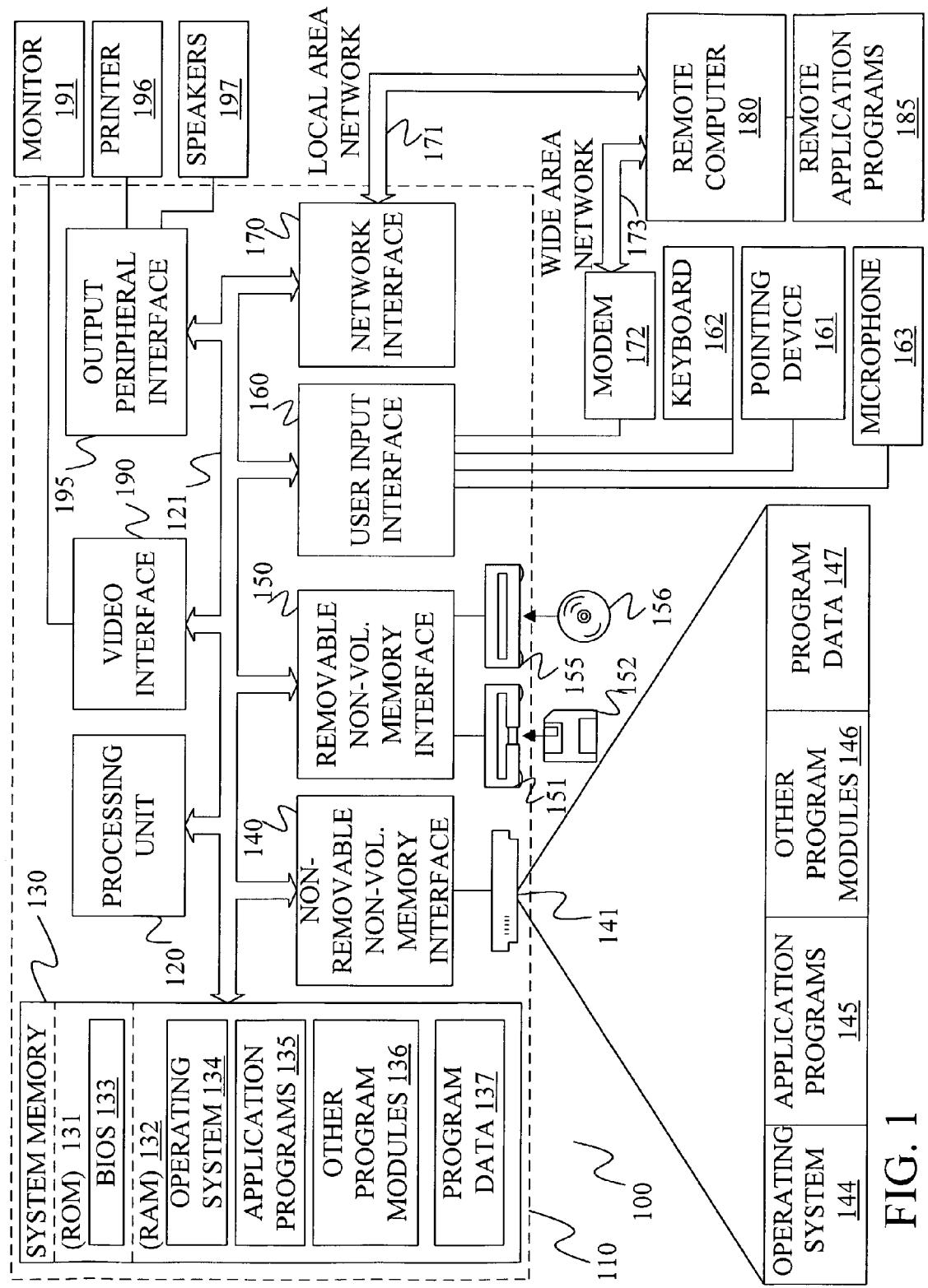
FIG. 1 is a block diagram of a computing device on which a user may enter a query under the present invention.

The present invention may be practiced within a single computing device or in a client-server architecture in which the client and server communicate through a network. FIG. 1 provides a block diagram of a single computing device on which the present invention may be practiced or which may be operated as the client in a client-server architecture.

The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
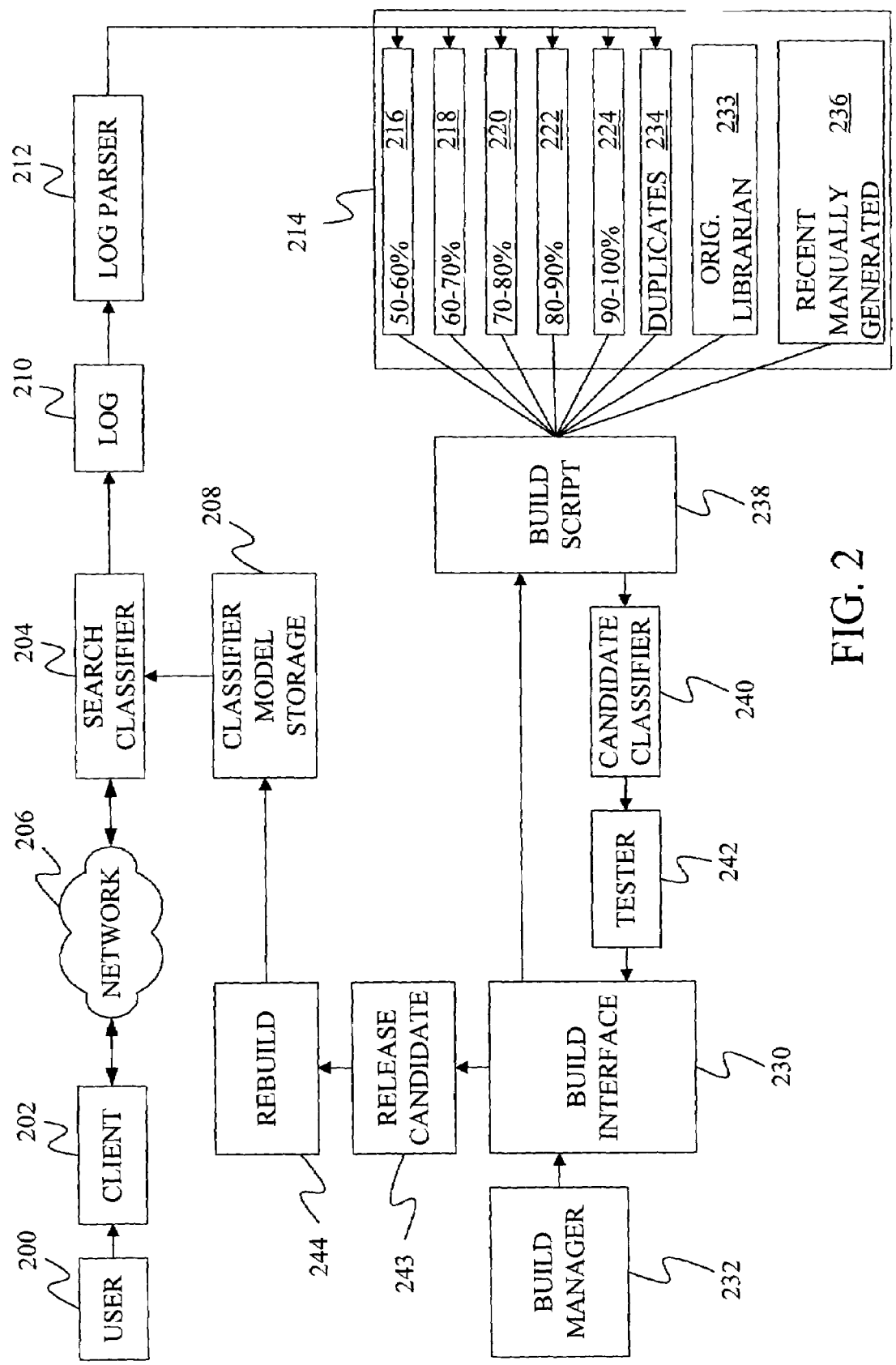
FIG. 2 is a block diagram of a client-server architecture under one embodiment of the present invention.

FIG. 2 provides a block diagram of a client-server architecture under one embodiment of the present invention. In FIG. 2, a user 200 enters a query using a client computing device 202. Client 202 communicates the query through a network 206 to a search classifier 204, which uses a set of classifier models stored in model storage 208 to classify the user query. Under one embodiment, the classifier models are support vector machines.

Figure 3:
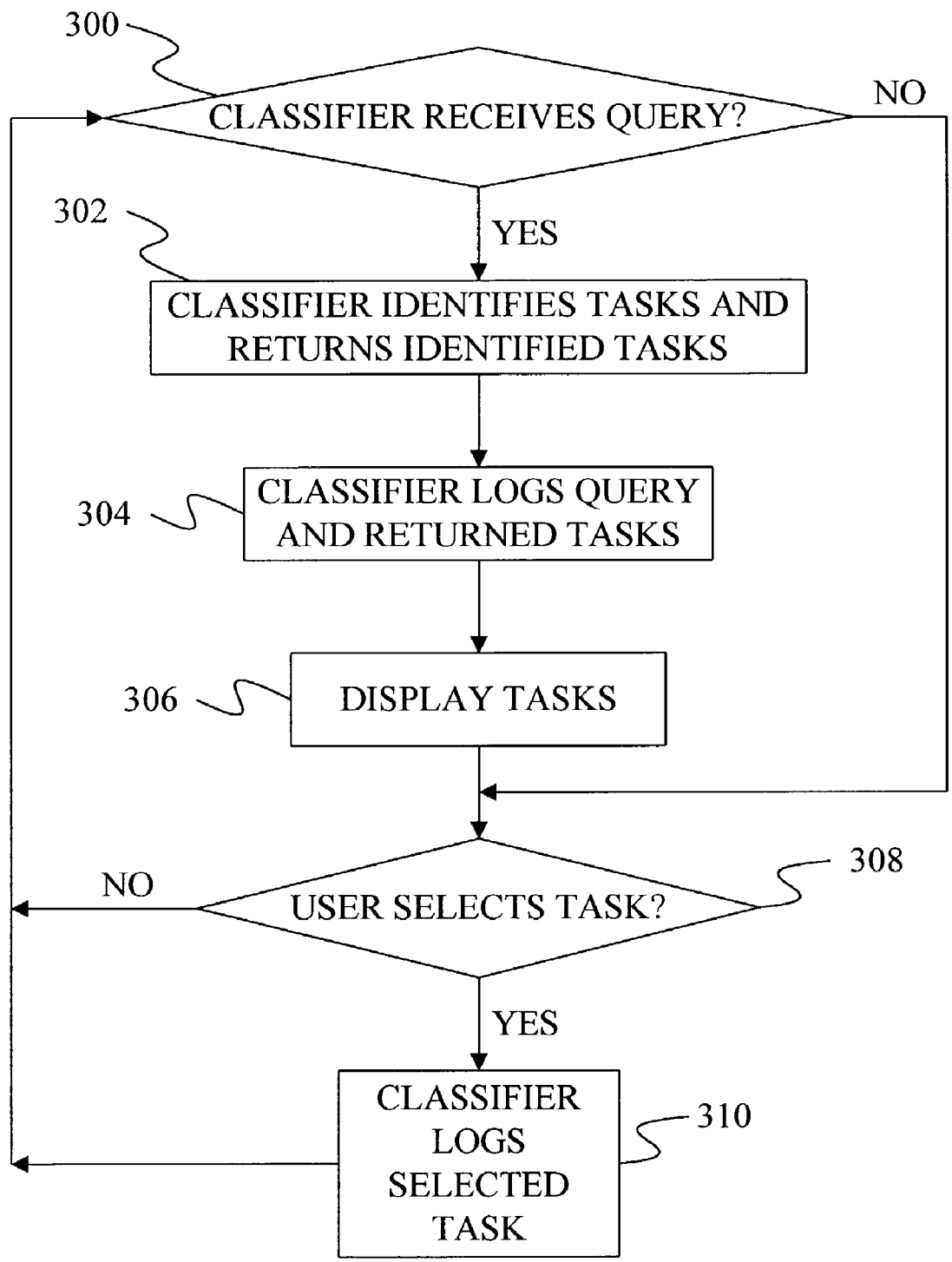
FIG. 3 is a flow diagram of a method of logging search queries and selected tasks under embodiments of the present invention.

As shown in the flow diagram of FIG. 3, when search classifier 204 receives a search query at step 300, it identifies a set of tasks that may be represented by the query and returns those identified tasks to the users at step 302. In embodiments in which support vector machines are used, the query is applied to a separate support vector machine for each task, and each separate support vector machine determines whether the query is likely related to a particular task and the confidence level of that determination. This confidence level is typically determined by determining the distance between a vector representing the query and a hyper-boundary defined within the support vector machine.

At step 304 of FIG. 3, search classifier 204 logs the query and the lists of tasks returned to the client 202 in a log 210. Typically, this log entry includes a session ID that uniquely but abstractly identifies a client 202 such that further communications from the same client will share the same session ID. In most embodiments, the session ID is not able to identify a particular user.

Figure 4:
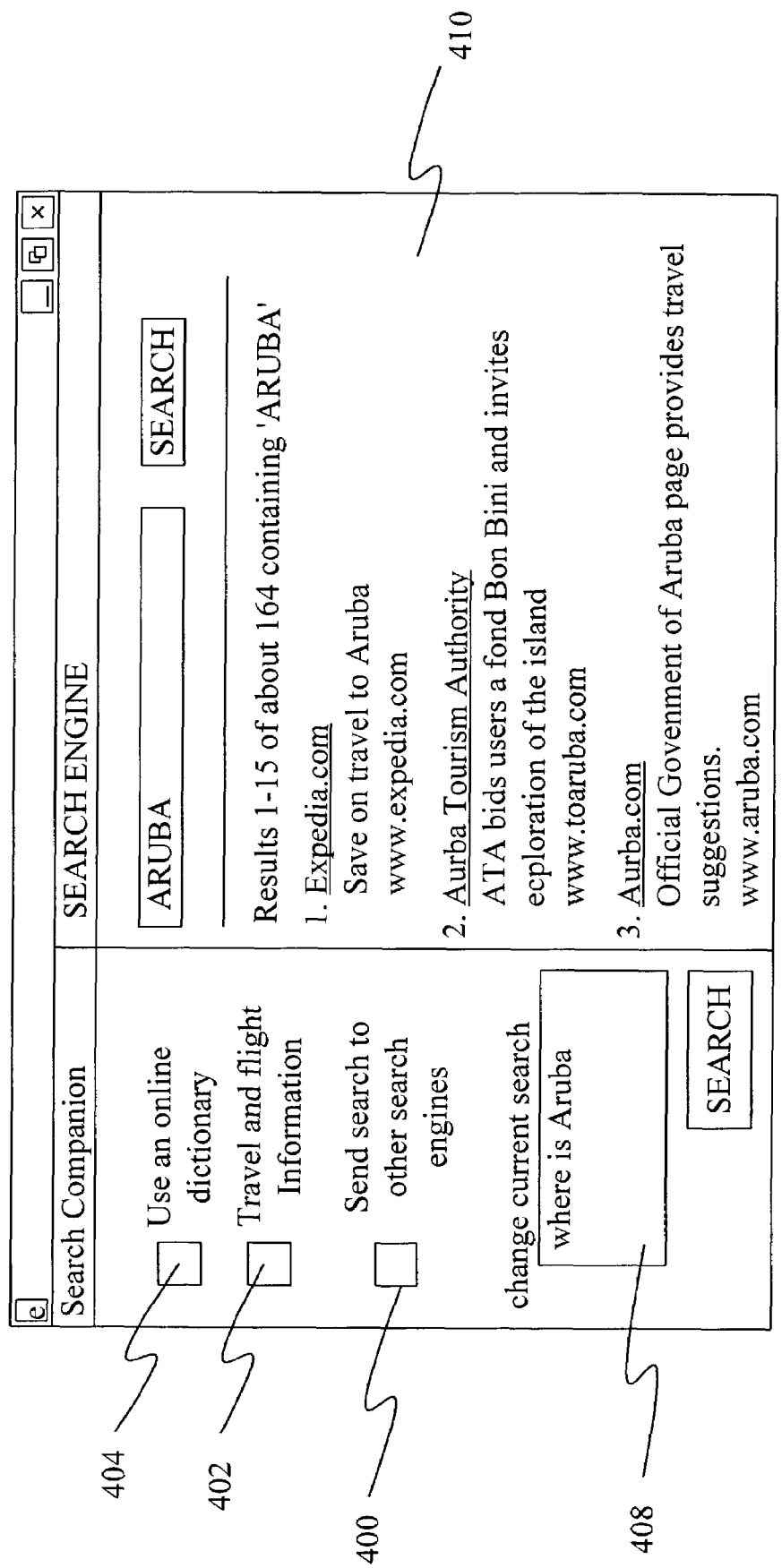
FIG. 4 is a display showing a list of tasks provided to the user in response to their query.

In step 306 of FIG. 3, client 202 displays the returned task to the user so that the user may select one or more of the tasks. An example of such a display is shown in FIG. 4 where tasks 400, 402, and 404 are shown displayed near a text edit box 408 containing the user's original query. Note that in some embodiments, the query is simultaneously applied to a search engine, which provides a set of results 410 that is displayed next to the identified tasks.

At step 308 of FIG. 3, if a user does not select a task, the process returns to step 300 where the search classifier waits for a new query to be submitted by one or more users. If a user does select a task at step 308, search classifier 204 logs the selected task at step 310. After the selected task has been logged at step 308, the process returns to a loop between steps 308 and 300 wherein the search classifier waits for one or more users to select a task previously returned to the user and/or waits for a new query from a user.

Over time, log 210 grows in size to include log entries from many users over many different search sessions. After a period of time, typically a week, log 210 is used to build a new classifier as shown in the steps of FIG. 5.

Figure 5:
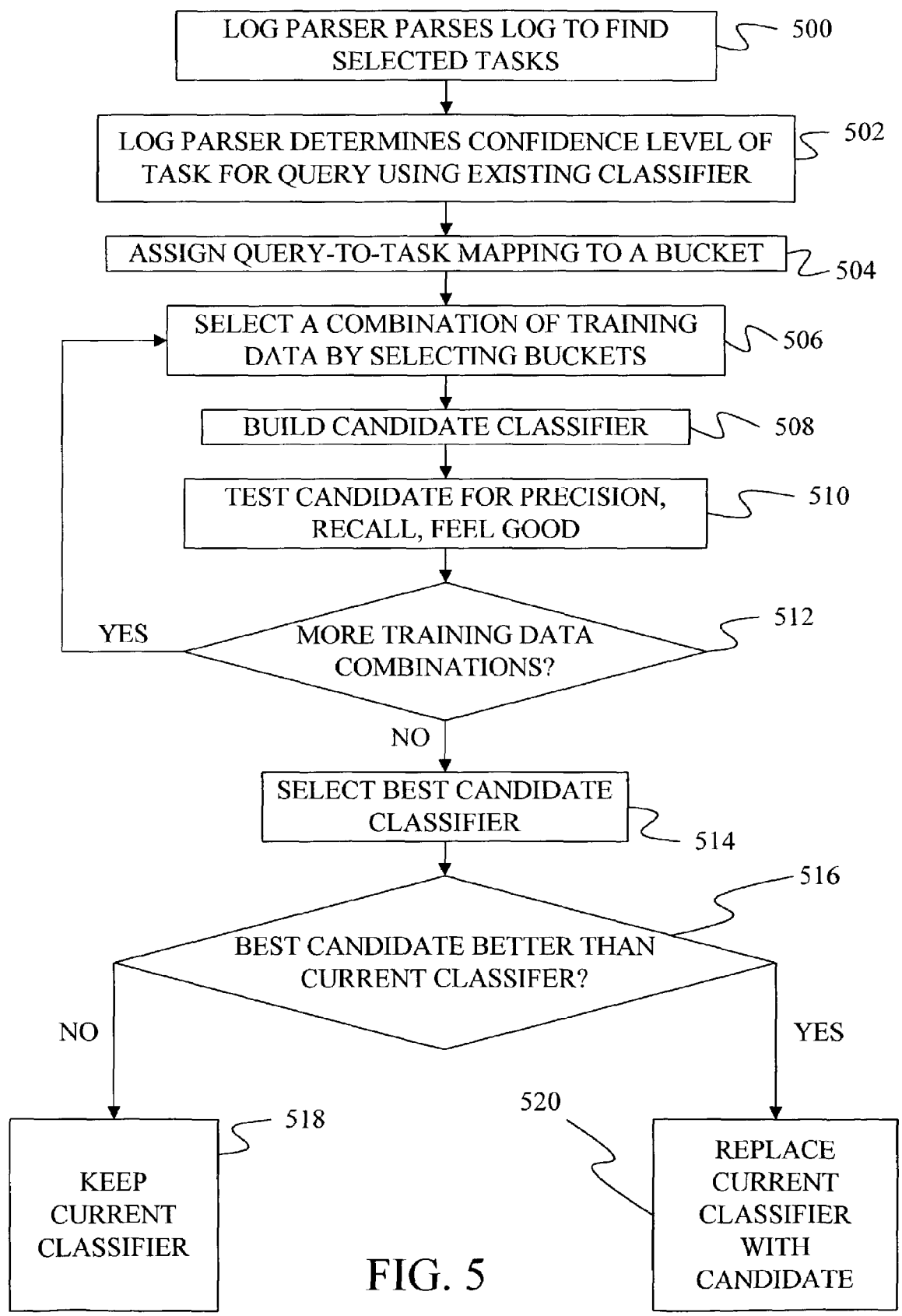
FIG. 5 is a flow diagram of a system for training a classifier using logged search queries under embodiments of the present invention.

At step 500 of FIG. 5, a log parser 212 accesses log 210 and parses the log to find entries in which a task was returned to a user and a subsequent entry in which a task was selected by the user. Note that the user is able to select more than one task and as such there may be multiple entries for different selected tasks based on a single query. A selected task is identified by matching the task to a task returned in an earlier log entry for the same session ID.

At step 502, log parser 212 applies each query that resulted in a selected task to the classifier model stored in storage 208 to determine the confidence level of the task selected by the user. The query, task and confidence level are then stored in a database 214.

The query and selected task represent an unsupervised query-to-task mapping. This mapping is unsupervised because it is generated automatically without any supervision as to whether the selected task is appropriate for the query.

Under one embodiment, query-to-task mappings stored in database 214 are stored with a confidence bucket indicator that indicates the general confidence level of the query-to-task mapping. In particular, a separate bucket is provided for each of the following ranges of confidence levels: 50-60%, 60-70%, 70-80%, 80-90% and 90-100%. These confidence buckets are shown as buckets 216, 218, 220, 222 and 224 in FIG. 2. The step of assigning query-to-task mappings to buckets is shown as step 504 in FIG. 5.

Figure 6:
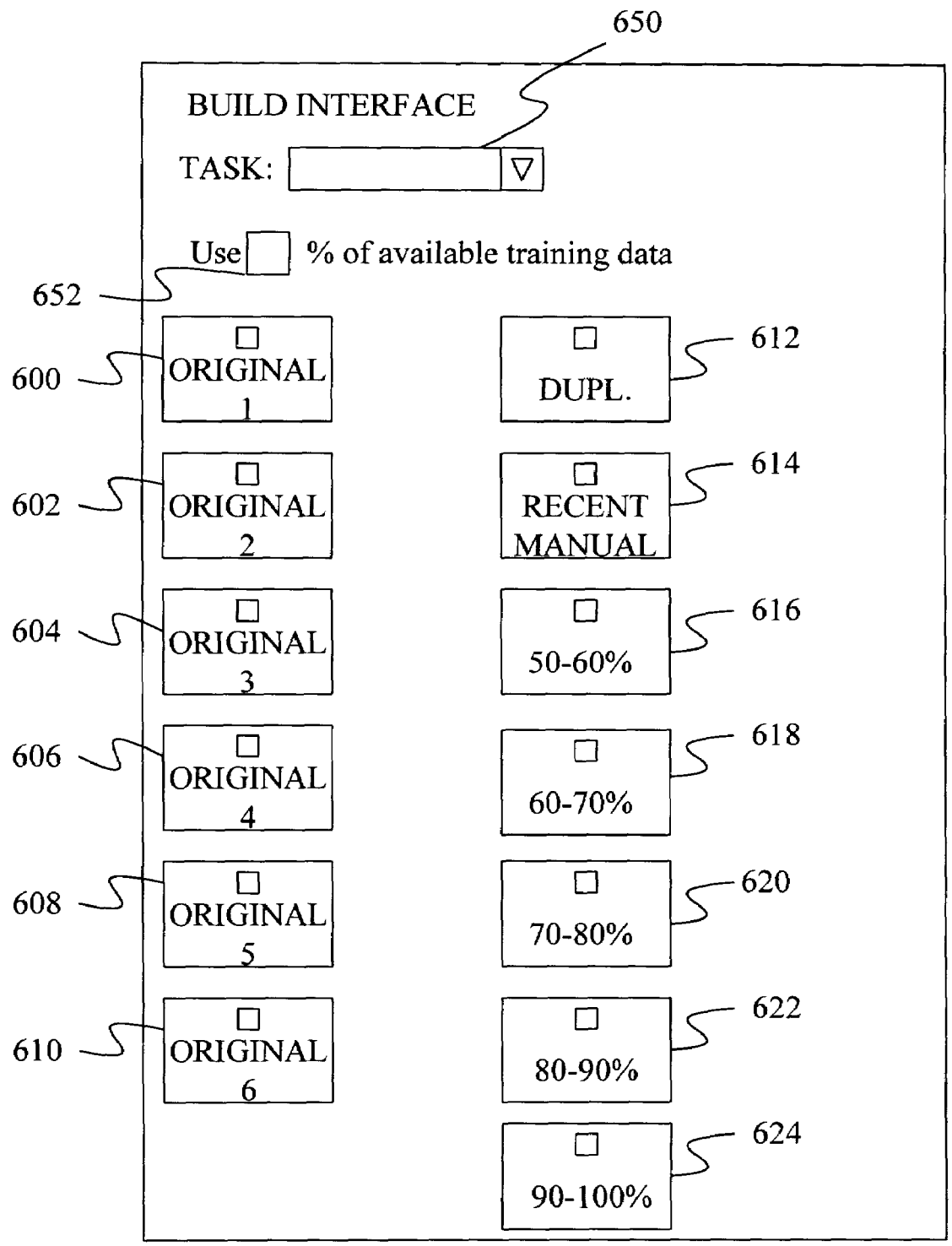
FIG. 6 is a display showing an interface for designating the training data to be used in building a classifier under one embodiment of the present invention.

Using a build interface 230, a build manager 232 selects a combination of training data at step 506. FIG. 6 provides an example of a build interface used by a build manager to designate the training data to be used in building a candidate classifier.

Under the embodiment of FIG. 6, the training data is designated on a per task basis. As such, a task selection box 650 is provided in which the build manager can designate a task. Note that in other embodiments, this task designation is not used and a single designation of the training data is applied to all of the tasks.

In FIG. 6, check boxes 600, 602, 604, 606, 608 and 610 correspond to portions of the original training data that were formed by a librarian and used to construct the original classifier. These original sets of training data are shown as original librarian data 233 in FIG. 2. Check box 612 allows the build manager 232 to designate a set of query-to-task mappings that have appeared multiple times in the log. Such multiple mappings are designated by log parser 212 as being duplicates 234.

Check box 614 allows build manager 232 to select training data has been newly created by a librarian. In other words, a librarian has associated a task with a query and that mapping has been stored as new manual training data 236 in FIG. 2. Check boxes 616, 618, 620, 622 and 624 allow build manager 232 to select the training data that has been assigned to the buckets associated with 50-60%, 60-70%, 70-80%, 80-90% and 90-100% confidence levels, respectively.

Under one embodiment, build interface 230 uses the selections made in the check boxes of FIG. 6 to construct a vector representing the information contained in the check boxes. Under this embodiment, each bit position in the vector represents a single check box in FIG. 6, and the bit position has a one when the check box has been selected and a zero when the check box has not been selected. This vector is passed to a build script 238 so that the build script knows which training data has been selected by the build manager.

Build interface 230 also includes a freshness box 652, which allows the build manager to designate the percent of the training data that is to be used in constructing the classifier. This percentage represents the latest x percent of the training data that was stored in the log. For example, if the percentage is set at twenty percent, the latest 20 percent of task mappings that are found in the database are used to construct the classifier. Thus, the freshness box allows the build manager to select the training data based on when the mappings were produced.

Freshness box 652 allows the build manager to tailor how much old training data will be used to construct the classifier. In addition, in embodiments where the training data is specified on a per task basis using task selection box 650, it is possible to set different freshness levels for different tasks. This is helpful because some tasks are highly time-specific and their queries change significantly over time making it desirable to use only the latest training data. Other tasks are not time-specific and their queries change little over time. For these tasks it is desirable to use as much training data as possible to improve the performance of the classifier.

Based on the check boxes selected in build interface 230, build script 238 retrieves the query-to-task mappings with the appropriate designations 216, 218, 220, 222, 224, 233, 234 and/or 236 and uses those query-to-task mappings to build a candidate classifier 240 at step 508.

Candidate classifier 240 is provided to a tester 242, which at step 510 of FIG. 5 measures the precision, recall and FeelGood performance of candidate classifier 240. Precision provides a measure of the classifiers ability to return only those tasks that are truly related to a query and not other unrelated tasks. Recall performance provides a measure of the candidate classifiers ability to return all of the tasks that are associated with a particular query. "FeelGood" is a metric that indicates, for a given known test query, whether the associated mapped task would appear as one of the top 4 tasks returned to an end user. If Yes, the mapping is scored a value of 1.0. If no, the mapping is scored a value of 0.0. Averaging this value over the entire testing set, produces a value between zero and one. For well-selected training sets this average is around 85%, meaning that 85 queries out of 100 caused the proper task to appear in the top 4.

Under one embodiment, the step of testing the candidate classifier at step 510 is performed using a "holdout" methodology. Under this method, the selected training data is divided into N sets. One of the sets is selected and the remaining sets are used to construct a candidate classifier. The set of training data that was not used to build the classifier is then applied to the classifier to determine its precision, recall and FeelGood performance. This is repeated for each set of data such that a separate classifier is built for each set of data that is held out. The performance of the candidate classifier is then determined as the average precision, recall, and FeelGood performance of each of the candidate classifiers generated for the training data.

At step 512, the build interface 230 is provided to build manager 232 once again so that the build manager may change the combination of training data used to construct the candidate classifier. If the build manager selects a new combination of training data, the process returns to step 506 and a new candidate classifier is constructed and tested.

When the build manager has tested all of the desired combinations of training data, the best candidate classifier is selected at step 514. The performance of this best candidate is then compared to the performance of the current classifier at step 516. If the performance of the current classifier is better than the performance of the candidate classifier, the current classifier is kept in place at step 518. If, however, the candidate classifier performs better than the current classifier, the candidate classifier is designated as a release candidate 243 and is provided to a rebuild tool 244. At step 520, rebuild tool 244 replaces the current classifier with release candidate 243 in model storage 208. In many embodiments, the changing of the classifier stored in model storage 208 s performed during non-peak times. When the search classifier is operated over multiple servers, the change in classifiers is performed in a step-wise fashion across each of the servers.

Thus, the present invention provides a method by which a search classifier may be updated using query-to-task mappings that have been designated by the user as being useful. As a result, the classifier improves in performance and is able to change over time with new queries such that it is no longer limited by the original training data used during the initial construction of the search classifier. As a result, less manually entered training data is needed under the present invention in order to update and expand the performance of the classifier.

While the present invention has been described with reference to queries and tasks, those skilled in the art will recognize that a query is simply one type of example that can be used by an example-based categorizer such as the one described above and a task is just one example of a category. Any type of example and any type of category may be used with the present invention.

Although the present invention has been described with reference to particular embodiments, workers skilled in the art will recognize that changes may be made in form and detail without departing from the spirit and scope of the invention.

What is claimed is:

1. A method of constructing a classifier for classifying user inputs, the method comprising:
   receiving a plurality of user inputs, wherein a user input comprises a user query;
   applying each user query to a first classifier that resides in a computing device to identify a respective task;
   for each user query, displaying at least one task to a user;
   logging a task selected by the user;
   creating separate unsupervised mappings between each user query and each respective task identified by the first classifier, wherein creating an unsupervised mapping comprises determining a confidence level for the unsupervised mapping;
   selecting fewer than all of the unsupervised mappings to train a new classifier wherein selecting an unsupervised mapping comprises determining that the confidence level for the unsupervised mapping is within a range of desired confidence levels and selecting the unsupervised mapping based on that determination; and
   training the new classifier based on the selected unsupervised mapping, the new classifier for classifying user queries into tasks.

2. The method of claim 1 further comprising testing the performance of the new classifier and replacing the first classifier with the new classifier if the performance of the new classifier is better than the performance of the first classifier.

3. The method of claim 1 further comprising using an unsupervised mapping to train a second new classifier.

4. The method of claim 3 further comprising testing the new classifier and the second new classifier to determine which is a better performing new classifier.

5. The method of claim 4 further comprising replacing the first classifier with the better performing new classifier.

6. The method of claim 5 wherein replacing the first classifier comprises only replacing the first classifier if the better performing new classifier performs better than the first classifier.

7. The method of claim 1 wherein selecting fewer than all of the unsupervised mappings comprises selecting the mappings based on when they were produced.

* * * * *